United States Patent
Vossel et al.

(10) Patent No.: US 7,014,178 B2
(45) Date of Patent: Mar. 21, 2006

(54) HYDRAULICALLY DAMPING BUSH BEARING

(75) Inventors: Andreas Vossel, Osnabrück (DE); Andreas Rodenberg, Diepenau (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 22 days.

(21) Appl. No.: 10/312,679

(22) PCT Filed: Apr. 9, 2002

(86) PCT No.: PCT/DE02/01304

§ 371 (c)(1),
(2), (4) Date: Dec. 10, 2002

(87) PCT Pub. No.: WO02/084143

PCT Pub. Date: Oct. 24, 2002

(65) Prior Publication Data

US 2003/0151178 A1 Aug. 14, 2003

(30) Foreign Application Priority Data

Apr. 11, 2001 (DE) ............................. 101 18 229

(51) Int. Cl.
*F16F 13/16* (2006.01)
*F16F 13/26* (2006.01)

(52) U.S. Cl. ................. 267/140.12; 267/219

(58) Field of Classification Search .......... 267/140.12, 267/140.13, 140.11, 219, 220, 141.2; 248/562, 248/636, 638; 180/300, 312, 902

See application file for complete search history.

(56) References Cited

U.S. PATENT DOCUMENTS 5,085,413 A 2/1992 Freudenberg et al.

(Continued)

FOREIGN PATENT DOCUMENTS

DE 39 03 230 8/1990

(Continued)

OTHER PUBLICATIONS

Patent Abstracts of Japan Publication No. 61274131, Dec. 4, 1986, Europe.

(Continued)

*Primary Examiner*—Douglas C. Butler
(74) *Attorney, Agent, or Firm*—McGlew and Tuttle, P.C.

(57) ABSTRACT

A hydraulically damping bush bearing is presented, in which an inner rubber mount, which comprises an essentially cylindrical or nearly cylindrical inner part (1) with an axial through hole (2), an outer sleeve (3) surrounding the inner part (1) as well as an elastomeric damping member (4), which is arranged between the inner part (1) and the outer sleeve (3) and is connected to them by vulcanization, is surrounded at its axial ends by chambers (5, 5') for receiving a fluid damping agent, wherein the chambers (5, 5') are formed by a hydraulic area, which is arranged separately around the rubber mount and which comprises a rigid channel carrier (6) pushed over the outer sleeve (3) of the rubber mount with a channel (7) for the flow-conducting connection of the chambers (5, 5'), an outer bush (8) supported axially on the channel carrier, and means (9, 9') arranged axially on both sides of the rubber mount for closing the bush bearing, wherein the means (9, 9') consist in their radially outer area of an elastomer, into which a support ring (12, 12') is vulcanized, via which the outer bush (8) is supported at the channel carrier (6).

33 Claims, 3 Drawing Sheets

U.S. PATENT DOCUMENTS

| | | | |
|---|---|---|---|
| 5,123,635 A | 6/1992 | Bouhours | |
| 5,165,669 A | 11/1992 | Mayerböck et al. | |
| 5,375,822 A | 12/1994 | Hirasawa et al. | |
| 5,690,320 A | 11/1997 | Kanda | |
| 5,927,697 A | 7/1999 | Miyamoto et al. | |
| 6,102,380 A | 8/2000 | Tsutsumida | |
| 2003/0151178 A1 * | 8/2003 | Vossel et al. | 267/140.12 |

FOREIGN PATENT DOCUMENTS

| | | |
|---|---|---|
| DE | 39 33 197 | 4/1991 |
| DE | 41 21 769 | 1/1992 |
| DE | 41 17 129 | 11/1992 |
| DE | 196 24 886 | 1/1997 |
| DE | 199 36 014 | 3/2001 |
| DE | 010118229 A1 * | 11/2002 |
| WO | WO 02/084143 A1 * | 10/2002 |

OTHER PUBLICATIONS

Patent Abstracts of Japan Publication No. 61165040, Jul. 25, 1986, Europe.

Patent Abstracts of Japan Publication No. 01003342, Jan. 9, 1989, Europe.

Patent Abstracts of Japan Publication No. 61274130, Dec. 4, 1986, Europe.

Japanese Patent Office Patent Abstracts of Japan Publication No. 01135940, May 29, 1989, Japan.

Patent Abstracts of Japan Vo. 10, No. 10. Jan. 16, 1986, Japan.

* cited by examiner

HYDRAULICALLY DAMPING BUSH BEARING

FIELD OF THE INVENTION

The present invention pertains to a hydraulically damping bush bearing, which is formed from an inner bearing designed as a rubber mount and a separate outer hydraulic area surrounding the said rubber mount.

BACKGROUND OF TH INVENTION

Bearings of a very great variety of designs, mainly rubber mounts, are used in many different areas to damp vibrations and to absorb forces. For example, they are used to mount parts of the wheel suspension or the drive assemblies in the automobile industry. Depending on the particular application, it is known that the damping action of elastomeric damping members can be additionally supported by hydraulic damping (so-called mass damping). To utilize the amortizing effects generated by the liquid mass, chambers for receiving a fluid damping agent are provided in the elastomeric insert parts and rubber bodies of the bearings. The chambers, whose size and position in the bearing depend on the required coordination, are connected to one another by one or more channels formed in special moldings additionally integrated within the bearing in a flow-conducting manner. Depending on the stress on the bearing, the damping agent is pressed from one chamber into another. Both bearings in which the hydraulic damping is used with respect to forces introduced radially into the bearing and bearings in which mainly the axial damping is supported by the damping fluid have become known in this connection. Bearings in which the amortizing effect of the damping agent in the axial and radial directions is utilized have been known as well.

One example of this is disclosed in DE 41 17 129 A1. The document describes a hydraulically damping bearing with a bearing core, a bearing sleeve surrounding same at a radially spaced location and an elastomer insert arranged between them with two groups of damping agent-filled chambers located one on top of another in the axial direction. Throttling channels, which are led diagonally through the bearing and which connect all chambers to one another, are formed by helical grooves in the outer circumference of the bearing core. Depending on the stress, the damping fluid circulates between the chambers connected to one another. The described embodiment of a bearing thus brings about a hydraulic damping in both the radial and axial directions, but it has a relatively complicated design. As is also known for other bearings according to the state of the art, the elastomeric insert acts as a carrying and hydraulic part at the same time. In light of the fact that the space available for installation is, in general, small, the damping is comparatively weak in the bush area at high static requirements in such bearings.

SUMMARY OF THE INVENTION

The object of the present invention is, in particular, to provide a hydraulically damping bush bearing, which makes possible the manufacture of bearings with small dimensions. The object is, furthermore, to design the bearing such that despite its simple basic form, it can be flexibly adapted to different intended purposes with respect to its damping characteristic and its coordination with little effort during its manufacture.

According to the present invention, the bearing comprises quasi two separate bearing parts, namely, an inner rubber mount and a hydraulic area surrounding this rubber mount. The inner rubber mount has a design that is known per se and has an inner part provided with an axial through hole, a cylindrical outer sleeve arranged concentrically around the said inner part, as well as an elastomeric damping member that is arranged between the inner part and the outer sleeve and is connected to the inner part and the outer sleeve by vulcanization.

Chambers for receiving a fluid damping agent are formed around the axial ends of this inner bearing due to the hydraulic area arranged separately around the rubber mount. The hydraulic area may comprise for this purpose a rigid channel carrier pushed over the outer sleeve of the rubber mount with a channel formed therein for the flow-conducting connection of the chambers, an outer bush supported axially on the said channel carrier, and means arranged axially on both sides of the rubber mount for axially closing the entire assembly unit. The elements that axially close the bearing may consist at least in a radially outer area of an elastomer, into which a support ring, via which the outer bush is supported against the channel carrier, is vulcanized.

The rigid channel part, with which the outer bush comes into contact at least partially and on which the outer bush of the bearing is supported, is used exclusively as the carrying part for the outer hydraulic area. The axial damping is independent in this respect from the nature of the inner rubber mount. However, it is possible for the two components of the bearing being designed as separate components to make the bearing highly flexible in terms of its damping characteristic or to correspondingly coordinate it during the manufacture. With basically identical axial damping characteristic, the radial damping characteristic can be varied by building up the hydraulic area around inner rubber mounts of different designs and dimensions depending on the intended use.

The means for closing the bush bearing on the axial side are formed according to a possible embodiment of the present invention by a cover disk with an elastomeric membrane extending radially up to the outer bush, which said membrane is vulcanized to the said cover disk. The rings, via which the outer bush is supported at the channel ring pushed over the outer sleeve of the inner rubber mount, are integrated in an axially extending section that is in contact with the outer bush. Corresponding to an embodiment suitable for practical use, the inner part of the rubber mount has for this purpose a shoulder at its axial ends, with which shoulder the cover disks, which are used to close the bearing axially and are designed as a perforated disk, are in contact with the edge of their holes. The hole of each cover disk concentrically surrounds the through hole of the inner bearing. The outer bush is advantageously a sleeve that is pressed, e.g., onto the inner structure comprising the inner bearing and the channel carrier and has an axial securing means at its axial ends. This may be the beading of the edge of the outer bush, which lies on the edge of the support ring enclosed by the membrane of the closing means.

Furthermore, it would be conceivable to use an outer bush with sections with different wall thicknesses, which has a shoulder coming into contact with the support ring at its axial ends.

In an especially advantageous variant of the bush bearing, the channel carrier pushed over the outer sleeve is divided into two parts, and division at right angles to the longitudinal axis of the bush bearing is particularly advantageous. The two parts of the channel carrier are designed such that the effective length of the channel that will later connect the axially outer chambers can be fixed during the manufacture or during its assembly by rotating the parts of the channel carrier against each other. As a result, the axial damping characteristic of the bearing can be set in a highly flexible manner.

Corresponding to another advantageous embodiment of the bearing according to the present invention, the inner bearing is likewise designed as a hydraulically damping bearing. As is known from hydraulically damping rubber mounts according to the state of the art, additional chambers for receiving a damping agent are provided for this purpose in the elastomeric damping member. These additional chambers are connected to one another by a channel, which is formed by arranging an additional channel carrier between the carrying body of the rubber mount, i.e., its elastomeric damping member, and its outer sleeve. While maintaining the basic principle, the outer hydraulic area of the bush bearing damps mainly axially introduced forces, while the inner rubber mount of the bush bearing, supported in this case by a hydraulic mass damping, has a damping action preferably in the radial direction. Moreover, it is possible to affect the radial damping characteristic of the bearing by designing its inner part differently. For example, a characteristic varying in the circumferential direction can be obtained by flattening the basically cylindrical inner part in some sections and due to the different rubber heights obtained while the cylindrical shape of its outer sleeve is maintained.

The fact that very small overall heights can be obtained because of the separate hydraulic area can be considered to be the special advantage of the present invention. Due to the rigid channel carrier, a very large active surface is obtained, which is larger by a factor of up to 10 than in the conventional bearings, in which the hydraulic part also acts as the carrying part at the same time. Besides, the possible calibration of the rubber mount leads to a markedly longer service life and it permits very small rubber heights, because the contraction strains, which are always present, are markedly reduced compared with the conditions prevailing in bearings of conventional design.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
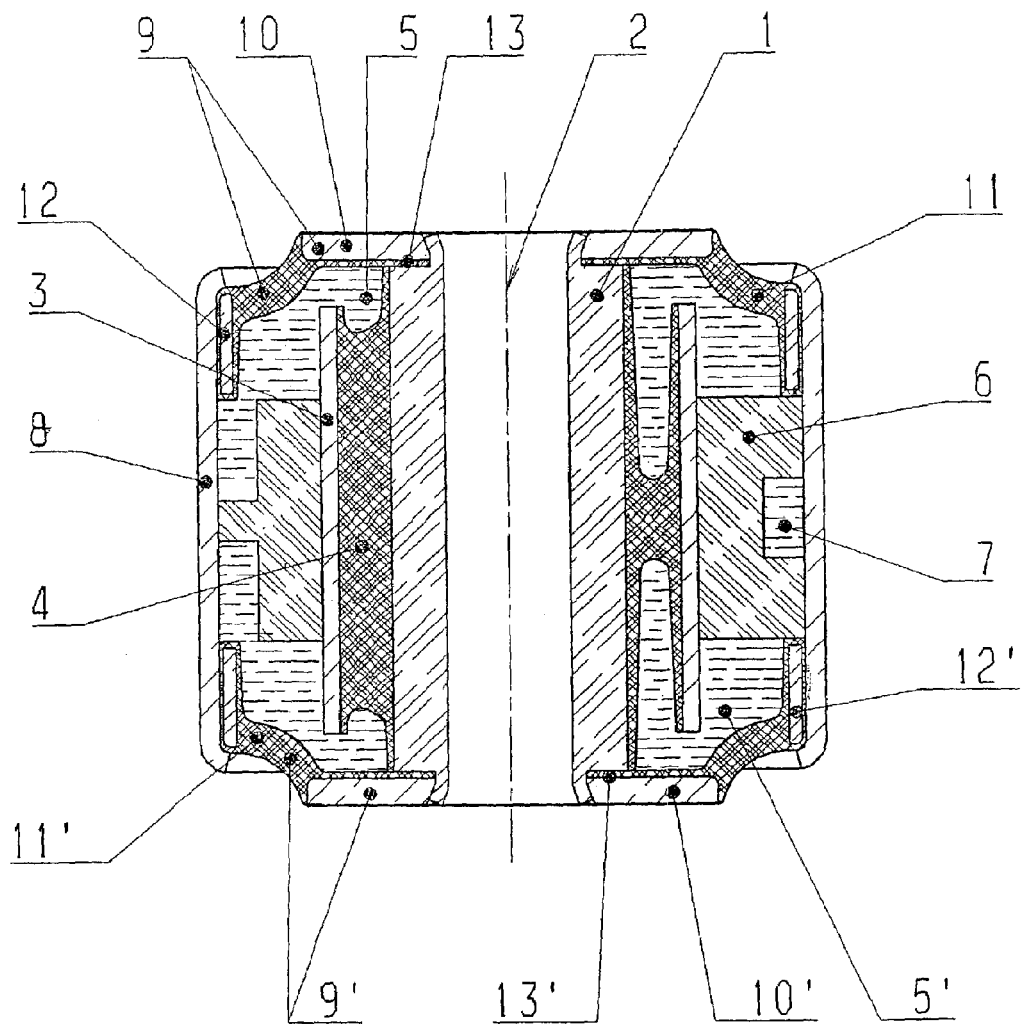
FIG. 1 shows a longitudinal section through a possible embodiment of the bearing according to the present invention.

Referring to the drawings in particular, FIG. 1 illustrates the basic design of the bush bearing according to the present invention. It can be clearly recognized that the bearing comprises essentially two separate bearing parts, namely, an inner rubber mount and a hydraulic area, which is arranged around the said rubber mount, i.e., is built quasi around the said rubber mount. The rubber mount comprises in the known manner a cylindrical inner part 1 with an axial through hole 2, an outer sleeve 3 surrounding the inner part 1 and the elastomeric damping member 4, which is arranged between the inner part 1 and the outer sleeve 3 and is connected to them by vulcanization. This arrangement, which forms an independent bearing, is surrounded by the hydraulic area. As can be seen, the hydraulic area comprises a channel carrier 6 pushed over the outer sleeve 3 of the inner rubber mount, an outer bush 8 supported on the said channel carrier 6, and means 9, 9' for axially closing the entire assembly unit. The means 9, 9' are cover disks 10, 10', to which an elastomeric membrane 11, 11' each is vulcanized. In the exemplary embodiment being shown, the perforated disks 10, 10' used for covering lie on a shoulder 13, 13' provided for this purpose on the inner part 1 of the rubber mount with the edge of their hole. As is apparent from the figure, the membranes 9, 9' connected to the cover disks 10, 10' by vulcanization extend in the axial direction up to the inner surface of the outer bush 8 and are in contact there with its inner contour by a section extending in the axial direction. A support ring 12, 12' each is vulcanized into the radially outer area of each membrane 9, 9' or, more precisely, into the section that is in contact with the inner contour of the outer bush 8. The outer bush 8 is supported on the channel carrier 6 via the support rings 12, 12'. In the bearing shown in the example, the outer bush 8 was pressed onto the structure formed by the inner rubber mount and the channel carrier 6 pushed over the outer sleeve 3 of the said rubber mount and was subsequently beaded in the area of its axial ends. The beading acts as an axial securing means 21 here. The chambers 5, 5' for receiving the damping agent are formed between the channel carrier 6, the outer bush 8 and the rubber membranes 11, 11', which are arranged on both sides at the axial ends of the outer bush 8 and are encompassed by the axial securing means 21. The said chambers are connected to one another in a flow-conducting manner via a channel 7 formed in the channel carrier 6. The hydraulic area of the bearing moves in the axial direction exclusively in the membrane 11, 11' under an axial load. The channel carrier 6 now acts as a supporting member, while the carrying body of the inner bearing has basically no effect on the axial damping characteristic. The axial damping characteristic is rather determined only by the coordination of the hydraulic area and its movement in the membranes 11, 11'. The chamber 5, 5' formed on the side on which the force acts is compressed by the axial movement of the hydraulic part and the damping agent present there is pressed via the channel 7 into the chamber 5, 5' located opposite. The damping action of the mass damping resulting herefrom is determined, among other things, by the effective channel length of the channel 7 connecting the chambers 5, 5' to one another.

Figure 2:
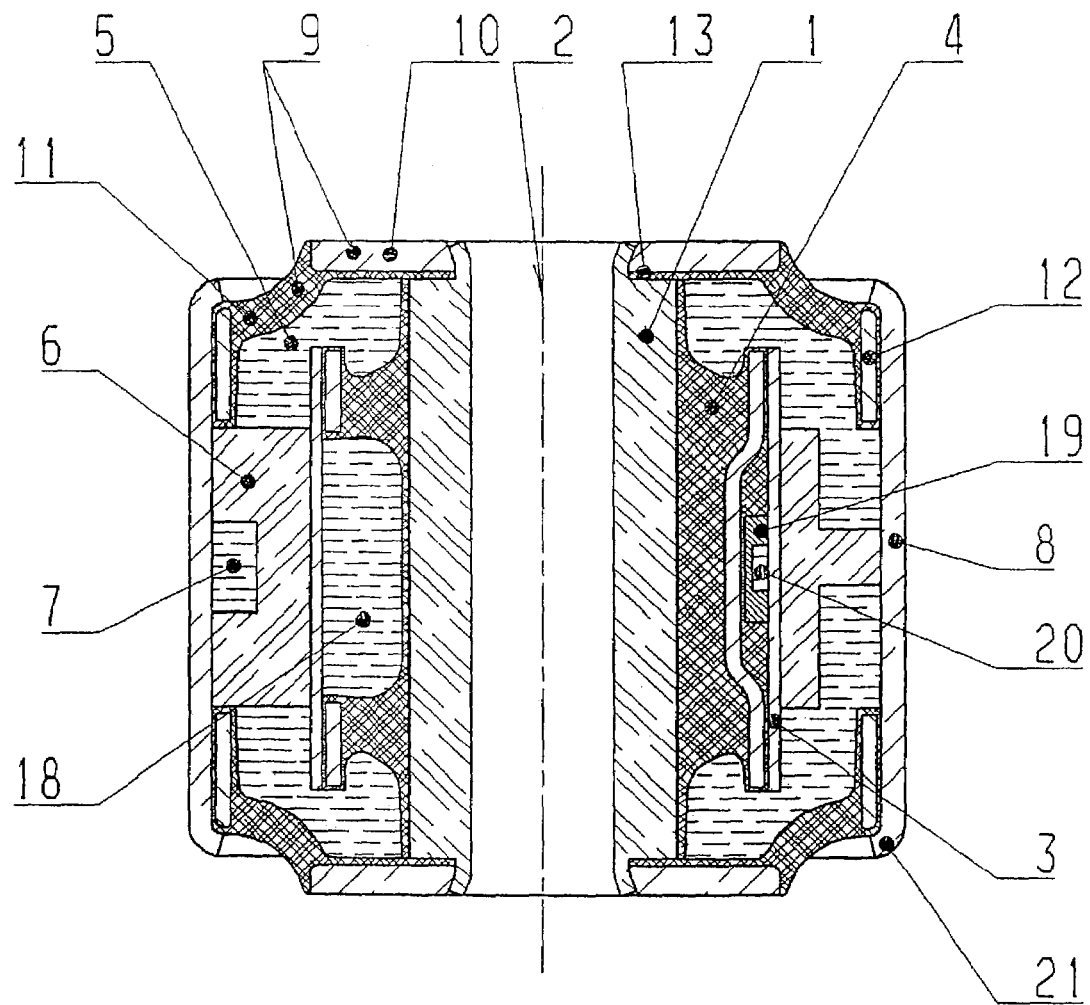
FIG. 2 shows a longitudinal section through an embodiment whose inner bearing has hydraulic mass damping.

FIG. 2 shows another variant of the bearing according to the present invention. This is a bearing in which the inner bearing part is also damped hydraulically. Additional chambers 18 are formed for this purpose in the rubber 4 that connects the inner part 1 to the outer sleeve 3 of the inner bearing. These chambers 18 are connected to one another in a flow-conducting manner by another channel carrier 19, which is arranged between the damping member 4 and the outer sleeve 3 of the inner bearing. The inner bearing exerts a damping action in the radial direction due to the nature and dimensioning of its elastomeric damping member 4 as well as due to the additional mass damping of the fluid damping agent. By contrast, the outer bearing area (hydraulic area) acts independently from the damping characteristic of the inner bearing and is used exclusively to damp forces introduced axially. The characteristics of the inner bearing may be varied in the circumferential direction by designing the inner part 1 as an inner part deviating from the cylindrical shape (e.g., with flattened sides opposite each other).

Figure 3:
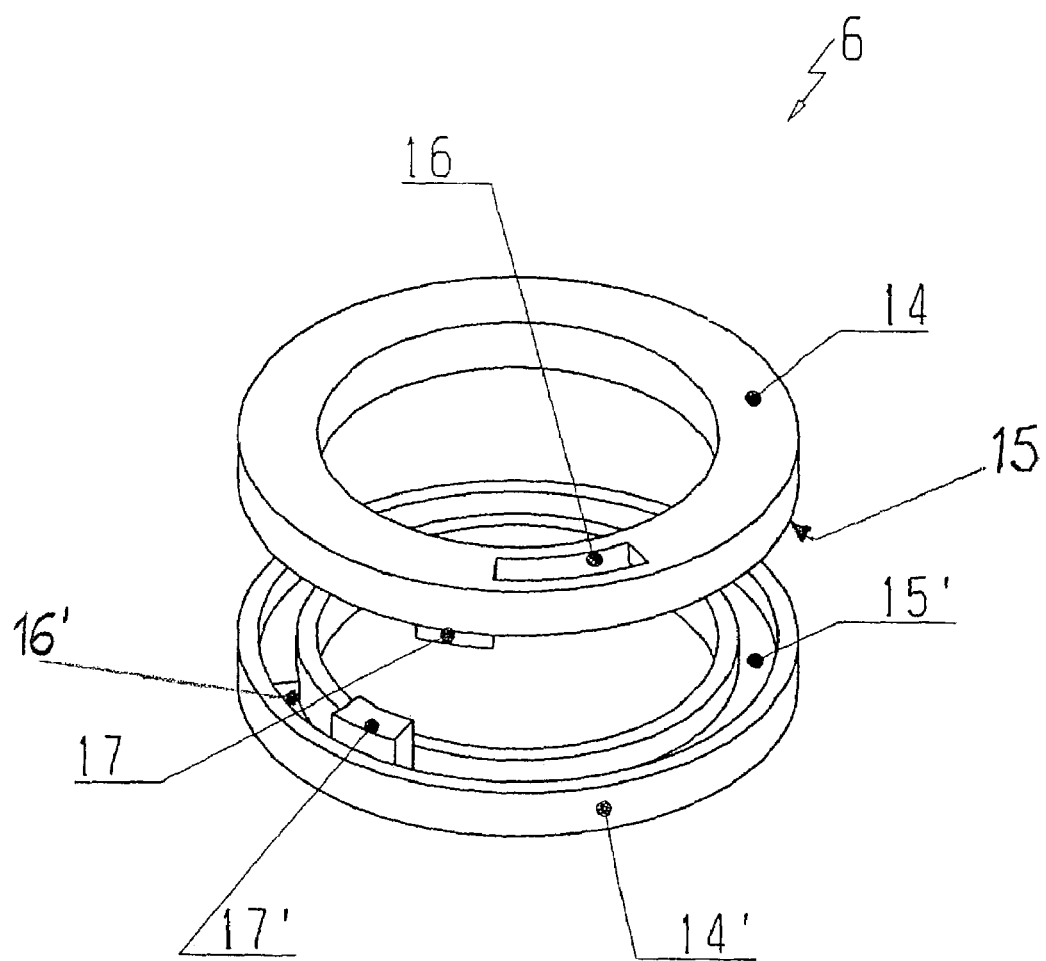
FIG. 3 shows a possible embodiment of the channel carrier axially supporting the outer bush.

FIG. 3 shows a special embodiment of the channel carrier 6 that is to be pushed over the outer sleeve 3 of the inner rubber mount. The channel carrier 6 has a two-part design in the axial direction here. It comprises two rings 14, 14', in which a groove 15, 15' each is milled into an axial outer surface. The groove 15, 15' has an opening 16, 16' at one point to the axially opposite side of the ring 14, 14'. In addition, a guide and stop element 17, 17' protrudes axially from the groove 15, 15' at the edge of this opening 16, 16'. To form the channel carrier 6, the rings 14, 14' are brought together, as is apparent from the figure, with the grooves 15, 15' milled into them, facing each other. Depending on the particular position of the openings 16, 16' provided in the rings 14, 14' in relation to one another, the effective channel length can be set to different values. It becomes apparent to the person skilled in the art that the fluid damping agent escapes from the axially arranged chambers 5, 5' or enters same via the openings 16, 16' when the bush bearing is assembled. The axial damping characteristic of the bearing can be coordinated during the manufacture due to the different positions of the openings 16, 16' in relation to one another and the resulting variation in the channel length.

While specific embodiments of the invention have been shown and described in detail to illustrate the application of the principles of the invention, it will be understood that the invention may be embodied otherwise without departing from such principles.

The invention claimed is:

1. A hydraulically damping bush bearing, comprising:
an inner rubber mount with an essentially cylindrical or nearly cylindrical inner part having an axial through hole, an outer sleeve surrounding said inner part and an elastomeric damping member arranged between said inner part and said outer sleeve, said elastomeric damping member being directly connected to said inner part by vulcanization and being directly connected to said outer sleeve by vulcanization;
chambers for receiving a fluid damping agent, said chambers surrounding axial ends of said inner rubber mount, said chambers being formed by a hydraulic area arranged separately around said inner rubber mount, said hydraulic area having a rigid channel carrier pushed over said outer sleeve of said inner rubber mount with a channel for flow-conducting connection of said chambers, said rigid channel carrier abutting against said outer sleeve and being movable axially relative to said outer sleeve;
an outer bush supported axially on said channel carrier;
a closing means arranged axially on a side of said inner rubber mount for closing the bush bearing; and
another closing means arranged axially on another side of said inner rubber mount for closing the bush bearing, each closing means including an elastomer with a radially outer area vulcanized to a supporting ring, said outer bush being supported on said channel carrier via said supporting ring.

2. A hydraulically damping bush bearing in accordance with claim 1, wherein said closing means and another closing means are arranged axially on both sides for closing the bush bearing, each of said closing means and another closing means comprising cover disks each with said elastomer forming an elastomeric membrane vulcanized to each of said cover disks and extending radially to said outer bush, said supporting ring being vulcanized in an axially extending section of said membrane that is in contact with said outer bush.

3. A hydraulically damping bush bearing in accordance with claim 2, wherein said inner rubber mount has axial ends with a shoulder on which lie said cover disks, said cover disks each being a perforated disk with a hole having an edge concentrically surrounding said through hole of said inner rubber mount.

4. A hydraulically damping bush bearing in accordance with claim 3, wherein said inner part is axially longer than said outer part and said outer part is axially longer than said rigid channel carrier.

5. A hydraulically damping bush bearing in accordance with claim 2, wherein each of said cover disks and said supporting rings are spaced apart from each other and interconnected by said elastomeric membrane.

6. A hydraulically damping bush bearing in accordance with claim 2, wherein each of said cover disks and said supporting rings are interconnected by said elastomeric membrane.

7. A hydraulically damping bush bearing in accordance with claim 1, wherein said outer bush is formed by a metallic sleeve pressed onto said inner rubber mount and onto said channel carrier, said channel carrier sliding over said outer sleeve of said inner rubber mount, said outer bush having axial securing means at axial ends.

8. A hydraulically damping bush bearing in accordance with claim 1, wherein said channel carrier of said hydraulic area is pushed over said outer sleeve of said inner bearing, said channel carrier including two channel carrier parts, wherein an effective channel length and consequently axial damping characteristic of the bush bearing can be set by a degree of rotation of said two channel carrier parts relative to one another during manufacture of the bearing.

9. A hydraulically damping bush bearing in accordance with claim 8, wherein said channel carrier of said hydraulic area is pushed over said outer sleeve of said inner bearing, said channel carrier being divided into two channel carrier parts in a plane extending transversely to a longitudinal axis of the bush bearing, and an effective channel length and consequently axial damping characteristic of the bush bearing can be set by a degree of rotation of said two channel carrier parts relative to one another during manufacture of the bearing.

10. A hydraulically damping bush bearing in accordance with claim 9, wherein said channel carrier of said hydraulic area comprises two rings in which a groove is milled on one axial side each, said groove having an opening passing axially through said respective ring in a section of its course, wherein said rings are assembled facing each other with their axial sides having said groove to form said channel carrier and each said groove forms one half of said channel.

11. A hydraulically damping bush bearing in accordance with claim 1, wherein said chambers for receiving a damping agent are formed in said elastomeric damping member of said inner bearing and are connected to one another by said channel of said channel carrier enclosed between said elastomeric damping member and said outer sleeve of said rubber mount.

12. A hydraulically damping bush bearing according to claim 1, wherein said inner part of said rubber mount is designed in a form of a cylinder flattened on two opposite sides.

13. A hydraulically damping bush bearing according to claim 1, wherein said inner surface of said channel carrier is completely cylindrical.

14. A hydraulically damping bush bearing, comprising:
an inner rubber mount with an inner part having an axial through hole, with an outer sleeve surrounding said inner part and with an elastomeric damping member arranged between said inner part and said outer sleeve, said elastomeric damping member being directly connected to said inner part by vulcanization and being directly connected to said outer sleeve by vulcanization,
a first chamber and a second chamber for receiving a fluid damping agent, said first chamber extending to an axial end of said inner rubber mount, and said second chamber extending to another axial end of said inner rubber mount, said chambers being formed in a hydraulic area arranged around said inner rubber mount, said hydraulic area having a rigid channel carrier disposed outwardly of said outer sleeve and mounted axially movably relative to said outer sleeve in contact with said outer sleeve of said inner rubber mount with a channel providing a flow connection between said first chamber and said second chamber;
an outer bush supported axially on said channel carrier;
a first supporting ring;
a second supporting ring; and
a first axial end closing part arranged on an axial side of said inner rubber mount and a second axial end closing part arranged on another axial side of said inner rubber mount, said first chamber being defined by said inner rubber mount, said channel carrier, said first axial end closing part and said outer bush, said second chamber being defined by said inner rubber mount, said channel carrier, said second axial end closing part and said outer bush, said first axial end closing part including an elastomer with a radially outer area vulcanized to said first supporting and said second axial end closing part including an elastomer with a radially outer area vulcanized to said second supporting ring, said outer bush being supported on said channel carrier via said first supporting ring and via said second supporting ring.

15. A hydraulically damping bush bearing in accordance with claim 14, wherein said first axial end closing part and said second axial end closing part are arranged axially on both sides for closing the bush bearing, said first axial end closing part and said second axial end closing part, each comprising a cover disk with an elastomeric membrane vulcanized to the bush bearing and extending radially to said outer bush, each said supporting ring being vulcanized in an axially extending section of a respective said membrane in contact with said outer bush.

16. A hydraulically damping bush bearing in accordance with claim 15, wherein said inner rubber mount has axial ends with a shoulder on which lie said cover disks, said cover disks each being a perforated disk with a hole having an edge concentrically surrounding said through hole of said inner rubber mount.

17. A hydraulically damping bush bearing in accordance with claim 14, wherein said outer bush is formed by a metallic sleeve pressed onto said inner rubber mount and onto said channel carrier, said rigid channel carrier being pushed over said outer sleeve of said inner rubber mount, said outer bush having an axial securing means at axial ends.

18. A hydraulically damping bush bearing in accordance with claim 14, wherein said channel carrier of said hydraulic area is pushed over said outer sleeve of said inner bearing, said channel carrier including two channel carrier parts, wherein an effective channel length and consequently axial damping characteristic of the bush bearing can be set by a degree of rotation of said two channel carrier parts relative to one another during manufacture of the bearing.

19. A hydraulically damping bush bearing in accordance with claim 18, wherein said channel earlier of said hydraulic area is pushed over said outer sleeve of said inner bearing, said channel carrier being divided into two channel carrier parts in a plane extending transversely to a longitudinal axis of the bush bearing, and an effective channel length and consequently axial damping characteristic of the bush bearing can be set by a degree of rotation of said two channel earner parts relative to one another during manufacture of the bearing.

20. A hydraulically damping bush bearing accordance with claim 19, wherein said channel carrier of said hydraulic area comprises two rings in which a groove is milled on one axial side each, said groove having an opening passing axially through said respective ring in a section of its course, wherein said rings are assembled facing each other with their axial sides having said groove to form said channel carrier and each said groove forms one half of said channel.

21. A hydraulically damping bush bearing in accordance with claim 14, wherein said chambers for receiving a damping agent are formed in said elastomeric damping member of said inner bearing and are connected to one another by said channel of said channel carrier enclosed between said elastomeric damping member and said outer sleeve of said rubber mount.

22. A hydraulically damping bush bearing according to claim 14, wherein said inner part of said rubber mount is designed in a form of a cylinder flattened on two opposite sides.

23. A hydraulically damping bush bearing, comprising:
an inner rubber mount including
an inner part having an axial through hole,
an outer sleeve surrounding said inner part and
an elastomeric damping member arranged between said inner part and said outer sleeve and being directly connected to said inner part by vulcanization and being directly connected to said outer sleeve by vulcanization;
an outer bush bearing;
a first end closure arranged on an axial side of said inner rubber mount and including a closing cover disk, a supporting ring and an elastomer with a radially outer area of said elastomer vulcanized to said supporting ring and a radially inner area of said elastomer vulcanized to said closing cover disk;
a second end closure arranged on another axial side of said inner rubber mount and including a second end closing cover disk, a second end supporting ring and a second end elastomer with a radially outer area of said second end elastomer being vulcanized to said second end supporting ring and a radially inner area of said second end elastomer vulcanized to said second end closing cover disk;
a rigid channel carrier arranged between said outer sleeve of said inner rubber mount and said outer bush bearing and slidably abutting against said outer sleeve and fixed axially relative to said outer bush bearing and in contact with said outer bush bearing, said inner rubber mount, said outer bush bearing, said closing cover disk, said second end closing cover disk, said elastomer, said second end elastomer, and said rigid channel carrier defining a first chamber and a second chamber for receiving a fluid damping agent, said channel carrier including a channel for flow connection between said first chamber and said second chamber.

24. A hydraulically damping bush bearing in accordance with claim 23, wherein said closing cover disk and said supporting ring are spaced apart from one another and said second end closing cover disk and said send end supporting ring are spaced apart from one another.

25. A hydraulically damping bush bearing in accordance with claim 23, wherein said elastomer is an elastomeric membrane interconnecting said closing cover disk and said supporting ring.

26. A hydraulically damping bush bearing in accordance with claim 23, wherein said inner part is axially longer than said outer part and said outer part is axially longer than said rigid channel carrier.

27. A hydraulically damping bush bearing in accordance with claim 23, wherein said inner rubber mount has axial ends with a shoulder on which said closing cover disks are arranged, said closing cover disks, each being a perforated disk with a hole having an edge concentrically surrounding said through hole of said inner rubber mount.

28. A hydraulically damping bush bearing according to claim 23, wherein said inner part is an integral monolithic member.

29. A hydraulically damping bush bearing according to claim 28, wherein said closing means and said elastomeric damping member are in direct contact with said inner part.

30. A hydraulically damping bush bearing according to claim 23, wherein said outer sleeve of said inner rubber mount is axially longer than said channel carrier.

31. A hydraulically damping bush bearing according to claim 23, wherein each of said closing end cover disk and said second closing end cover disk has a hole and are separate from other parts.

32. A hydraulically damping bush bearing according to claim 23, wherein said closing means are formed symmetrically to a plane perpendicular to a longitudinal axis of said inner part.

33. A hydraulically damping bush bearing according to claim 23, wherein said elastomeric damping member comprises two separate axial recesses and each of said recesses are part of said first and second chambers.

* * * * *